US011135888B2

(12) United States Patent
Reuter, II et al.

(10) Patent No.: US 11,135,888 B2
(45) Date of Patent: Oct. 5, 2021

(54) CLOSED INTEGRATED AIR MANAGEMENT MODULE (71) Applicant: BeijingWest Industries Co., Ltd., Beijing (CN)

(72) Inventors: David Fredrick Reuter, II, Beavercreek, OH (US); Daniel Norbert Borgemenke, Springboro, OH (US); Bryan P. Riddiford, Dayton, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 49 days.

(21) Appl. No.: 16/802,251

(22) Filed: Feb. 26, 2020

(65) Prior Publication Data
US 2020/0269645 A1    Aug. 27, 2020

Related U.S. Application Data (60) Provisional application No. 62/810,943, filed on Feb. 26, 2019.

(51) Int. Cl.
| | |
|---|---|
| *B60G 11/27* | (2006.01) |
| *B60G 11/30* | (2006.01) |
| *B60G 17/015* | (2006.01) |
| *F04B 41/00* | (2006.01) |
| *B60G 17/018* | (2006.01) |

(52) U.S. Cl.
CPC ............. *B60G 11/30* (2013.01); *B60G 11/27* (2013.01); *B60G 17/0155* (2013.01); *F04B 41/00* (2013.01); *B60G 17/018* (2013.01); *B60G 2202/152* (2013.01); *B60G 2202/42* (2013.01); *B60G 2400/51* (2013.01)

(58) Field of Classification Search
CPC .... B60G 11/30; B60G 11/27; B60G 17/0155; B60G 17/018; B60G 2202/152; B60G 2202/42; B60G 2400/51; F04B 41/00
USPC ...................... 280/124.157, 124.158, 124.16
See application file for complete search history.

(56) References Cited

U.S. PATENT DOCUMENTS

| | | | |
|---|---|---|---|
| 6,036,449 | A | 3/2000 | Nishar et al. |
| 6,354,617 | B1 | 3/2002 | Behmenburg et al. |
| 6,726,189 | B2 | 4/2004 | Folchert |
| 6,824,145 | B2 | 11/2004 | Behmenburg |
| 7,810,827 | B2 | 10/2010 | Sheehan et al. |
| 7,881,840 | B2 | 2/2011 | Rehra et al. |
| 8,219,262 | B2 | 7/2012 | Stiller |
| 8,448,951 | B2 | 5/2013 | Hein |

(Continued)

*Primary Examiner* — Toan C To
(74) *Attorney, Agent, or Firm* — William H. Honaker; Dickinson Wright PLLC (57) ABSTRACT

An air management system including at least one air spring and a compressor. The compressor defines a compartment having an inlet and an outlet. A reservoir is fluidly connected to the air spring and the compressor. A piston is moveable in the compartment and is reciprocally moveable in a compression stroke and an extension stroke in response to actuation of the motor in order to build-up air pressure at the outlet. The piston defines at least one passage extending between the extension chamber and the compression chamber, and at least one check valve positioned in the at least one passage such that air pressure in the compression chamber biases the piston toward the extension chamber to reduce a torque load on the motor during movement of the piston.

20 Claims, 5 Drawing Sheets

(56) References Cited

U.S. PATENT DOCUMENTS

| | | | |
|---|---|---|---|
| 8,532,875 B2 | 9/2013 | Engelhardt et al. | |
| 8,761,999 B2 | 6/2014 | Ilias et al. | |
| 8,814,190 B2 * | 8/2014 | Becher | F04B 7/02 |
| | | | 280/124.16 |
| 8,905,071 B2 | 12/2014 | Coombs et al. | |
| 10,767,639 B2 * | 9/2020 | Meissner | F04B 27/04 |
| 10,875,376 B2 * | 12/2020 | Ito | B60G 17/0565 |
| 2012/0193845 A1 * | 8/2012 | Yamanaka | F04B 39/066 |
| | | | 267/64.28 |
| 2013/0276899 A1 * | 10/2013 | Frank | B60G 17/0523 |
| | | | 137/1 |
| 2019/0003470 A1 * | 1/2019 | Kawai | F04B 35/045 |
| 2019/0149029 A1 * | 5/2019 | Kawai | F04B 35/04 |
| | | | 417/416 |
| 2019/0356207 A1 * | 11/2019 | Koyama | F04B 35/045 |
| 2020/0158104 A1 * | 5/2020 | Stabenow | B60G 17/0155 |
| 2021/0001679 A1 * | 1/2021 | Meier | B60G 17/0523 |

\* cited by examiner

CLOSED INTEGRATED AIR MANAGEMENT MODULE

CROSS-REFERENCE TO RELATED APPLICATIONS

This application claims the benefit of U.S. Provisional Application Patent Ser. No. 62/810,943, filed on Feb. 26, 2019, the entire disclosure of which is hereby incorporated herein by reference.

TECHNICAL FIELD

An air management system for controlling an air suspension assembly of an automotive vehicle.

BACKGROUND OF THE DISCLOSURE

Air suspension assemblies are known in the art for use on various vehicles, including automobiles. Air suspension assemblies typically include a plurality of air springs, each for interconnecting the body and one of the wheels of the automotive vehicle for damping relative forces between the body and the wheels, and for adjusting the height of the automotive vehicle. One example of such an air suspension assembly is disclosed in U.S. Pat. No. 5,465,209 to Sammut et al. The air suspension assembly includes a compressor for filling the air springs as well as a plurality of valves that are disposed between the compressor and the air springs and controlled by a controller for regulating air flow from the compressor to the air springs.

Known air management systems can be relatively pricey, bulky and complex in design. Accordingly, there remains a need for low-cost improvements to such air management systems.

SUMMARY OF THE INVENTION

An air management system for a vehicle having a body and a plurality of wheels. The air management system includes at least one air spring for interconnecting the body and one of the wheels, and a compressor including a motor for filling the at least one air spring. A reservoir is fluidly connected to the at least one air spring and the at least one compressor for receiving air from the compressor and the at least one air spring, and passing air to the at least one compressor and the at least one air spring. The compressor defines a compartment having an inlet and an outlet. A piston separates the compartment into a compression chamber and an extension chamber. The piston is moveable in response to actuation of the motor in a compression stroke toward the compression chamber and an extension stroke toward the extension chamber. Reciprocal movement of the piston causes a build-up of air pressure at the outlet. The inlet and the outlet of the piston are selectively connectable to the reservoir and the at least one air spring in an inflation mode and a deflation mode. In the inflation mode, the inlet is connected to the reservoir and the outlet is connected to the at least one air spring. In the deflation mode, the inlet is connected to the air spring and the outlet is connected to the reservoir. The piston defines at least one passage extending between the extension chamber and the compression chamber. The piston includes at least one check valve positioned in the at least one passage. The check valve allows air to flow from the inlet to the outlet while preventing air from flowing from the outlet to the inlet during the reciprocal movement of the piston such that air pressure in the compression chamber biases the piston toward the extension chamber to reduce a torque load on the motor during movement of the piston.

Accordingly, the subject air management system provides a low cost, closed air management system that efficiently inflates and deflates air springs because it utilizes pressure from the reservoir or the air springs to reduce a torque load on the motor. Because of the decreased torque load, the motor also operates quietly and small compressors may be utilized.

Furthermore, because the subject air management system operates as a closed system, it is not necessary to dry and recharge a dryer during each raising and lowering cycle as is common with open systems.

Furthermore, the subject air management system allows for the use of small, high volume valve components.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
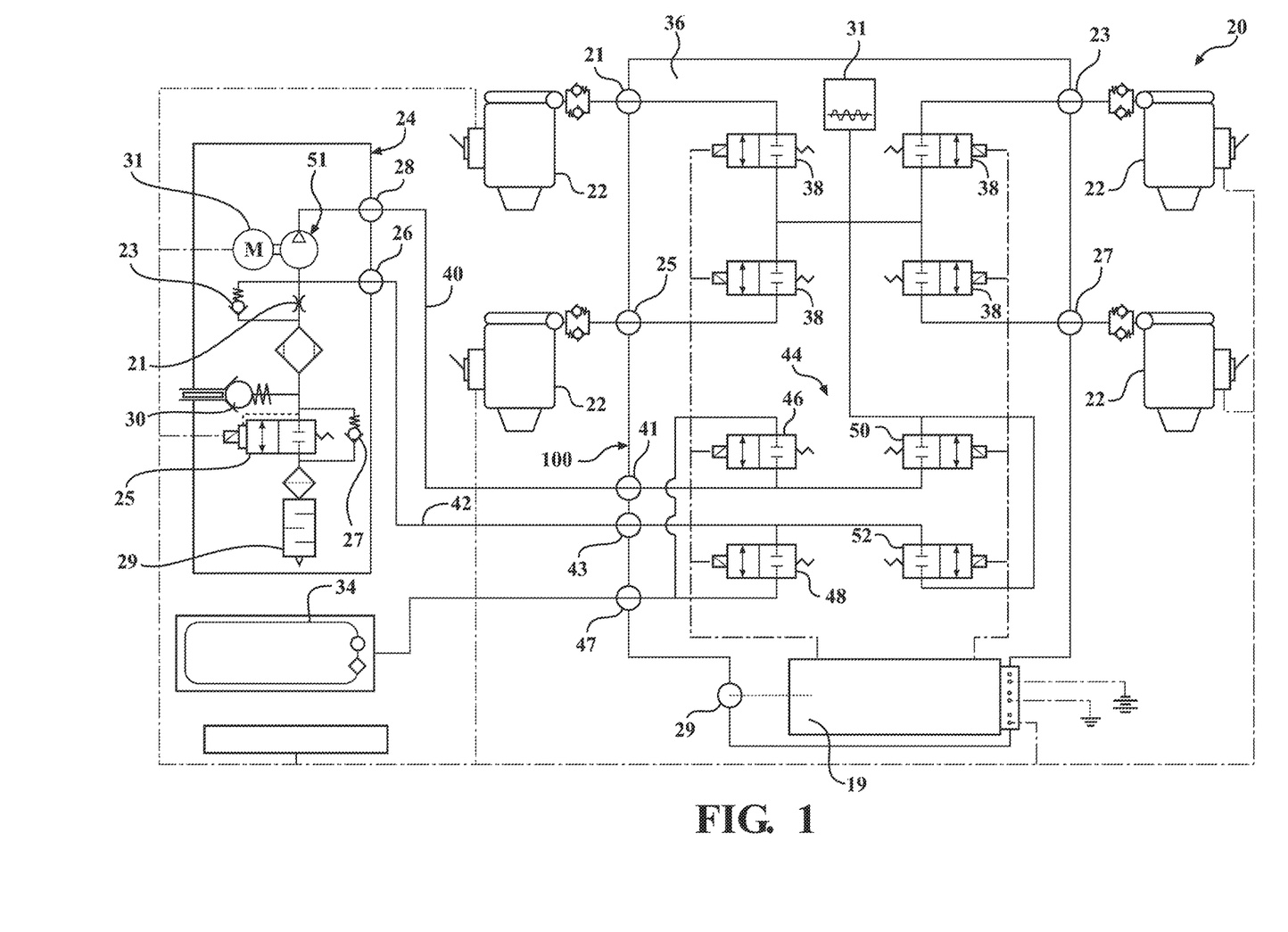
FIG. 1 is a schematic diagram of an example embodiment of an air management system.

Referring to the Figures, wherein like numerals indicate correspond parts throughout the several views, an air management module system 20 for controlling an air suspension assembly of a vehicle is provided. With reference to FIG. 1, the system 20 includes a plurality of air springs 22 that interconnect a body and wheels of the vehicle. The air management system 20 also includes a differential pressure compressor 24 that is connected to the air springs 22 for filling and deflating the air springs 22, as well as a reservoir 34 for storing pressurized air from the compressor 24 and/or air springs 22. The compressor 24 has an inlet 26 for receiving air from the air springs 22 and reservoir 34. The compressor also has an outlet 28 for passing air to the air springs 22 and reservoir 34. The compressor 24 further includes a fill valve 30 for receiving atmospheric air into the compressor 24 for replenishing the air management system 20. A dryer 32 is disposed adjacent to the fill valve 30 for removing moisture from air that enters the compressor 24 through the fill valve 30. A dryer purge orifice 21 is positioned adjacent to the dryer 32, and a low restriction dryer purge orifice bypass 23, is positioned in parallel with the dryer purge orifice 21 for use during a recharging of air into the system 20. The compressor 24 further includes an exhaust valve 25 with integral pressure relief to keep the system 20 below a critical pressure limit. A low restriction exhaust valve bypass 27 is positioned in parallel with the exhaust valve 25 for use during recharging of air. The compressor 24 also includes an intake/exhaust muffler 29 for reducing air flow noise during filling and emptying of air in the system. The compressor 24 also includes a motor 31 for exercising the compressor 24. An electronic control unit (ECU) 19 is provided for controlling the air management system 20 for inflating and deflating the air springs 22.

A manifold block assembly 36, or Pneumatic Control Unit PCU 36, fluidly connects the air springs 22, the compressor 24, and the reservoir 34. The manifold block assembly 36 includes a machined manifold block body 37. A plurality of spring valves 38 are disposed in the manifold block body 37 and are fluidly connected to one of the air springs 22 through a left front spring port 21, a right front spring port 23, a left rear spring port 25 and a right rear spring port 27 to allow and prevent air from flowing into and out of the air springs 22. A first line 40 extends from the outlet 28 of the compressor 24 to a compressor inlet port 41 of the manifold block body 37 to pass air from the compressor 24 to the manifold block assembly 36. A second line 42 extends from the inlet 26 of the compressor 24 to suction port 43 of the manifold block body 37 for passing air from the manifold block assembly 36 to the compressor 24. The manifold block body 37 also includes a ventilation port 29 for allowing air to exit the manifold block body 37. The manifold block assembly 36 further includes a pressure sensor 31 for determining a pressure in the air springs 22.

An H-bridge valve assembly 44 is provided in the manifold block body 37 for directing air between the reservoir 34, compressor 24 and manifold block assembly 36. The H-bridge valve assembly 44 includes a first reservoir valve 46 that is fluidly connected to the first line 40 and the reservoir 34 through a reservoir port 47 of the manifold block body 37. Furthermore, a second reservoir valve 48 is fluidly connected to the second line 42 and the reservoir 34 through the reservoir port 47. The H-bridge valve assembly 44 also includes a first spring direction valve 50 that is fluidly connected to the first line 40 and the spring valves 38. Furthermore, a second spring directional valve 52 is fluidly connected to the second line 42 and the spring valves 38.

Figure 2:
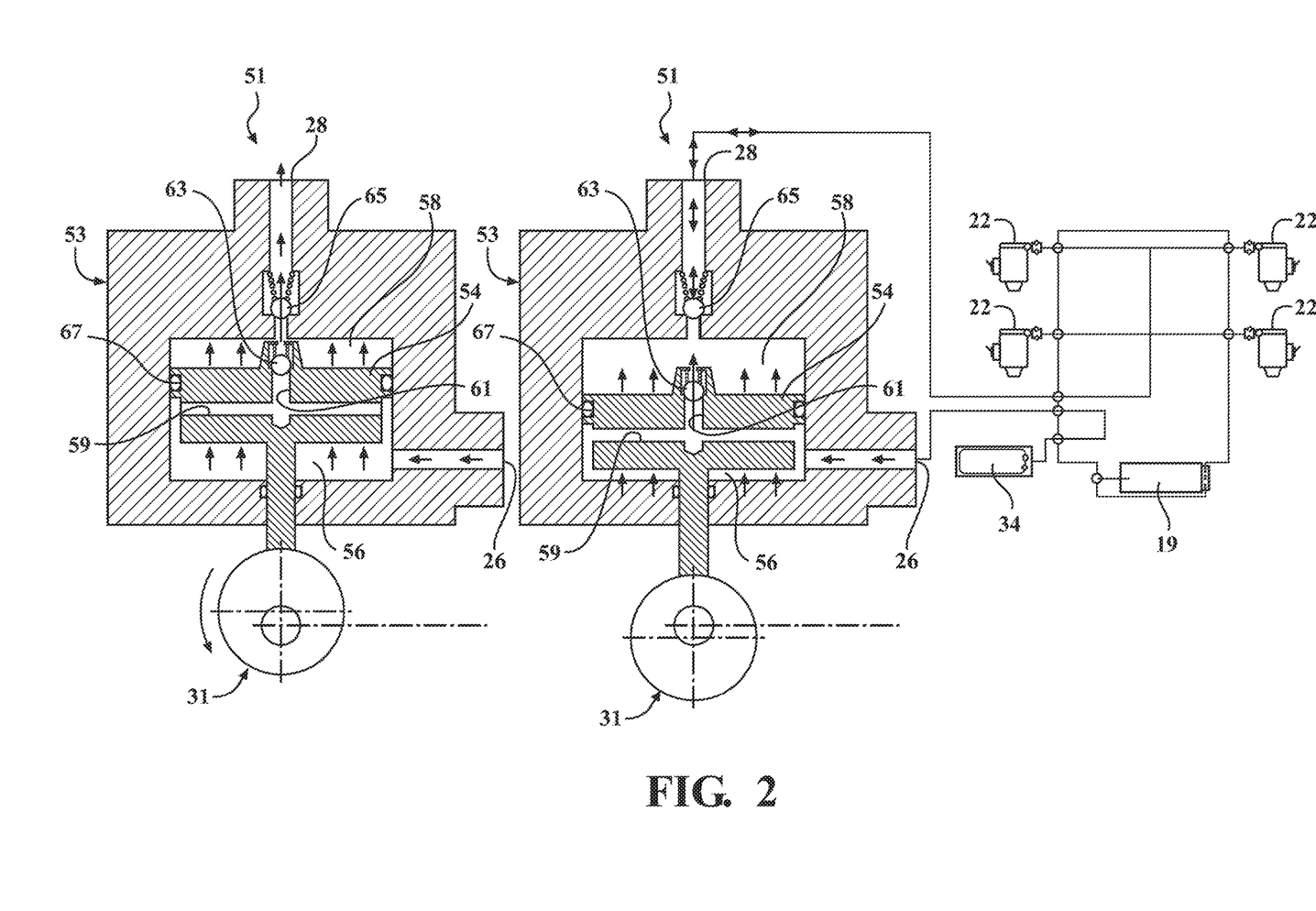
FIG. 2 is a side schematic view of a piston assembly illustrating movement of a piston thereof.
Figure 3:
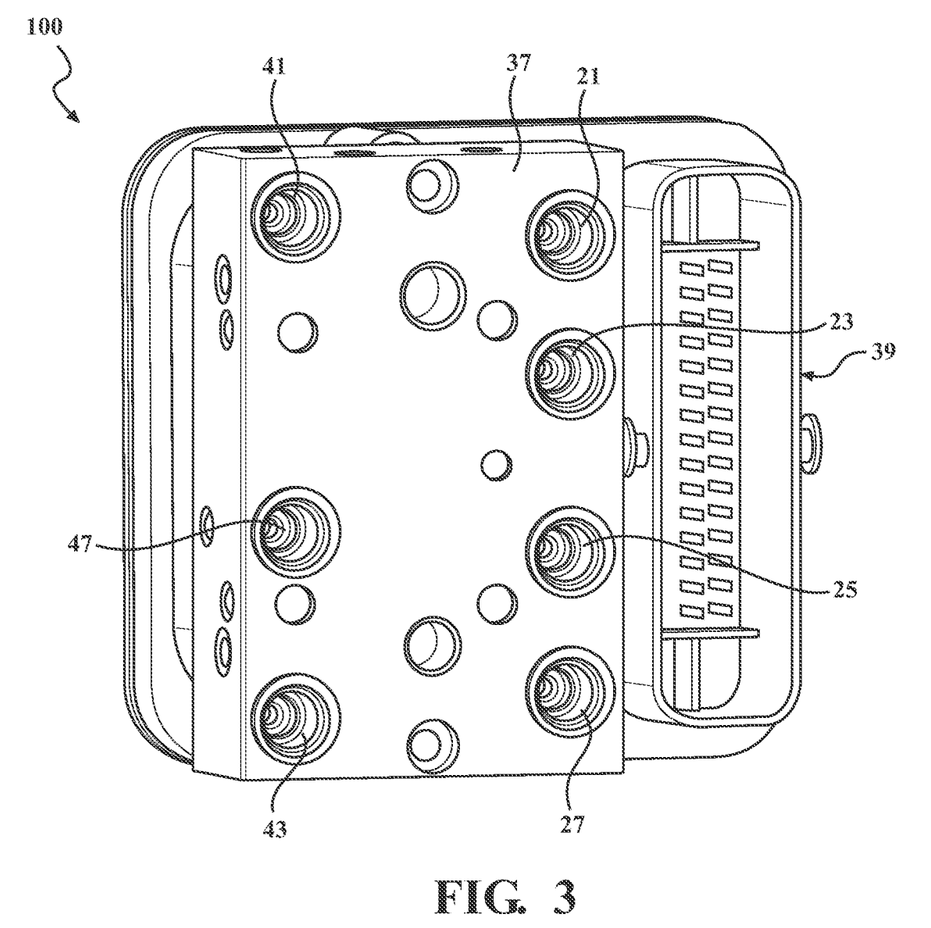
FIG. 3 is a perspective view of an electro-pneumatic control unit according to an aspect of the disclosure.
Figure 4:
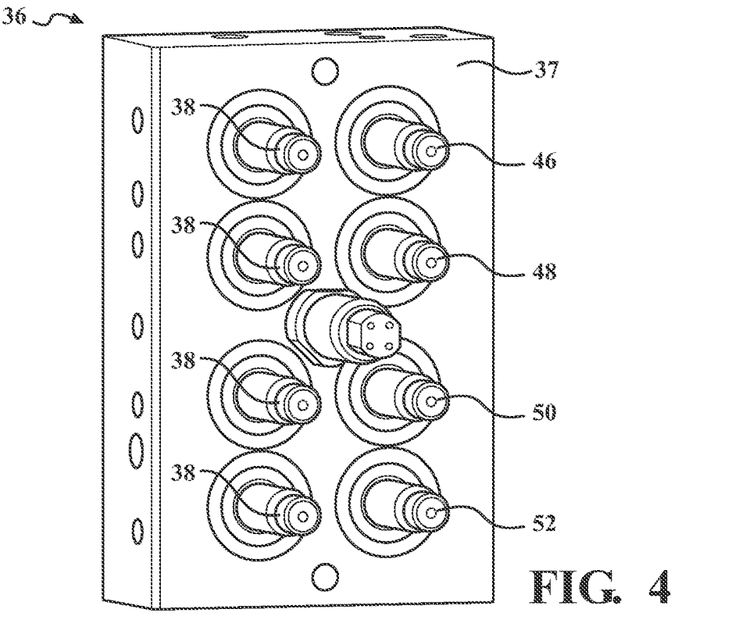
FIG. 4 is a perspective view of a pneumatic control unit of the electro-pneumatic control unit of FIG. 3.
Figure 5:
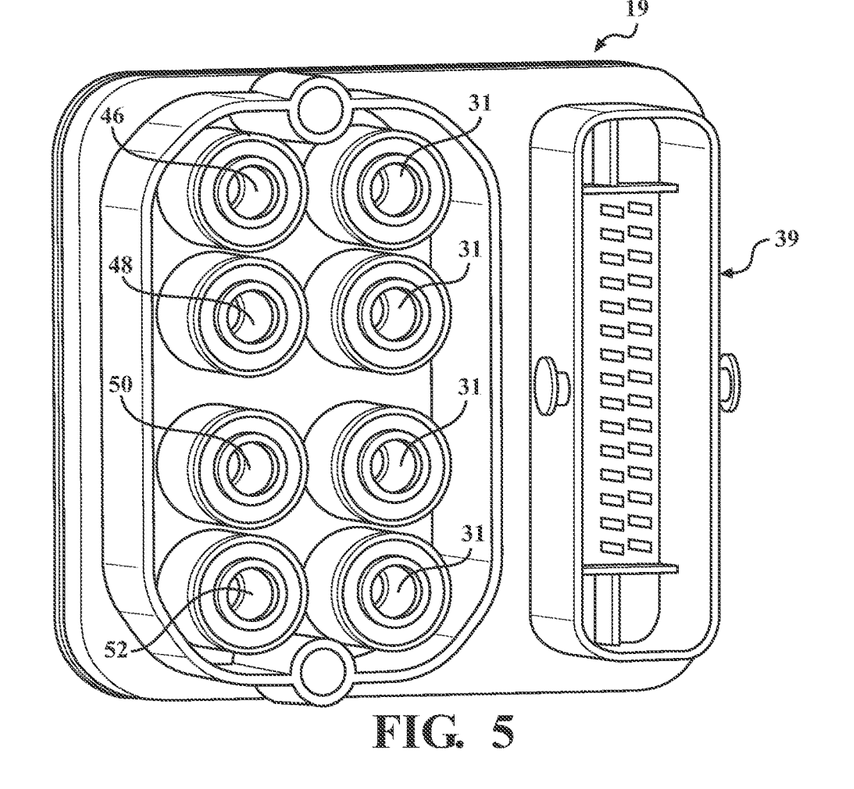
FIG. 5 is a perspective view of an electronic control unit of the electro-pneumatic control unit of FIG. 3.
Figure 6:
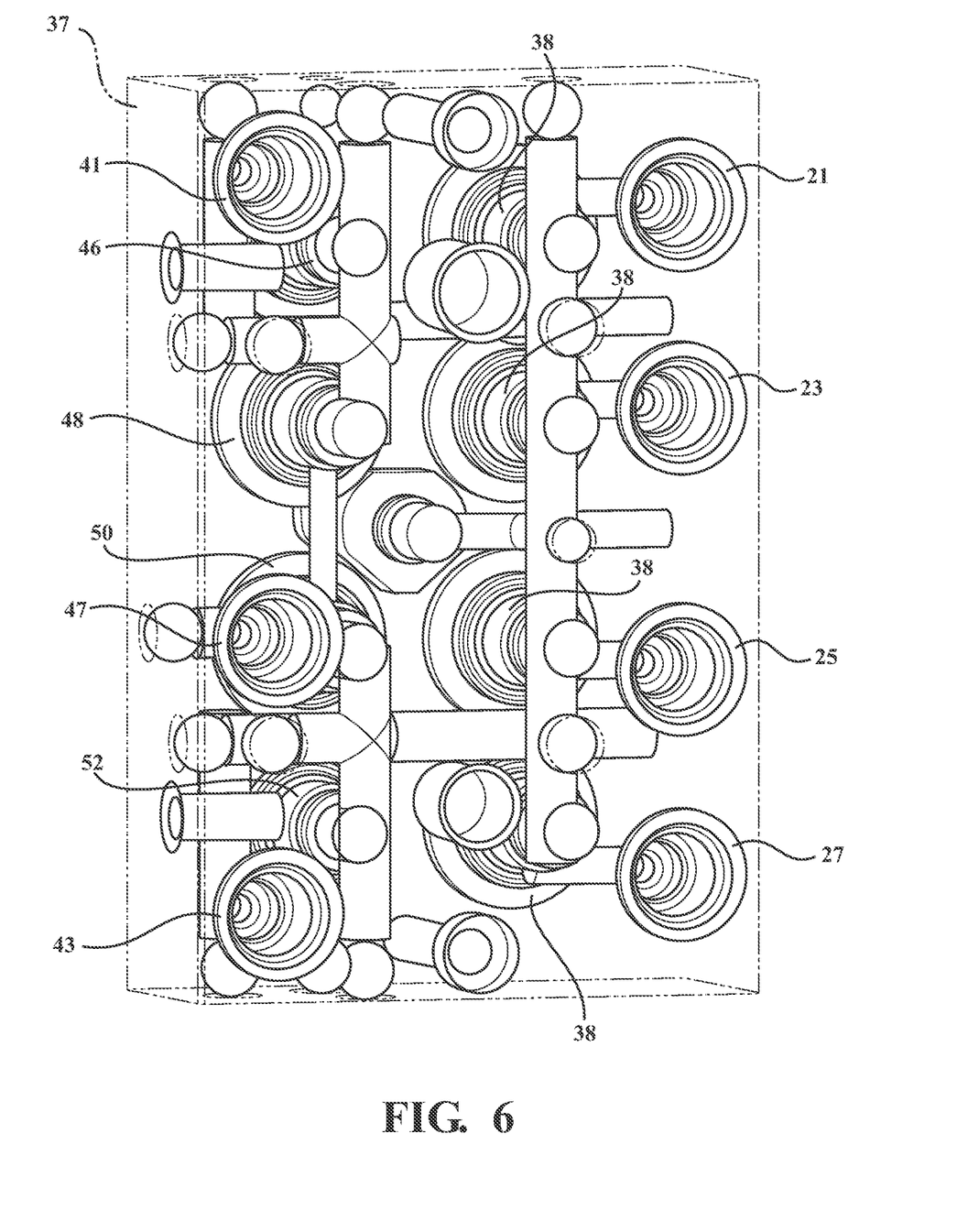
FIG. 6 is a partial perspective view of a manifold block with external seal balls of the electro-pneumatic control unit of FIG. 3.

As best illustrated in FIG. 2, the compressor 24 further includes piston assembly 51 that is driven by the motor 31. The piston assembly 51 includes a piston housing 53 that defines a compartment 56, 58. A stepped piston 54 is disposed in the compartment 56, 58 and divides the compartment 56, 58 into a compression chamber 56 and an extension chamber 58. The compression chamber 56 is fluidly connected to the inlet 26 of the compressor 24 and the extension chamber 58 is fluidly connected to the outlet 28 of the compressor 24. As such the inlet 26 and outlet 28 of the compressor 24 also serve as an inlet and outlet of the piston 54. Reciprocal movement of the piston 54 provides an increase in the pressure at the outlet 28. The piston 54 defines a horizontal passage 59 that is fluidly connected to the compression chamber 56, and a vertical passage 61 that fluidly connects the horizontal passage 59 to the extension chamber 58. A first check valve 63 is positioned in the vertical passage 61, and a second check valve 65 is positioned in the outlet 28. The first and second check valves 63, 65 are lightly loaded. The check valves 63, 65 allow air to flow from the inlet 26 to the outlet 28 of the compressor 24, while preventing air from flowing from the outlet 28 to the inlet 26. A seal 67 is positioned about the piston 54 for preventing fluid from passing between the piston 54 and the piston housing 53. Furthermore, the inlet 26 of the piston 54 of the compressor 24 may be connected to the atmosphere by way of the fill valve 30 to provide for system replenishment.

As illustrated, during operation of the compressor 24, the check valves 63, 65 allow pressure from the reservoir 34 to be exerted on the piston 54 to reduce a torque load on the motor to allow the compressor 24 to run more efficiently. It should be appreciated that during use of the system 20, only minor losses are experienced from friction in the seal 67, from the lightly loaded spring of the check valve 60, and from a piston area differential.

As will be explained in greater detail below, The inlet 26 and the outlet 28 of the piston 54 are selectively connectable to the reservoir 34 and the at least one air spring 22 to allow for bi-directional fluid flow. More particularly, with reference to FIGS. 1 and 2, during a filling process, one or more of the air springs 22, the second reservoir valve 48 and the first spring directional valve 50 are opened along with the spring valve(s) 38 of the air spring(s) 22 that should be filled. Furthermore, the first reservoir valve 46 and the second spring directional valve 52 are closed. As such, air passes from the reservoir 34, through the second reservoir valve 48, and to the compression chamber 56 of the compressor 24 to exert pressure on the piston 54 to reduce the torque load on the motor of the compressor 24. Air also flows through the piston 54 and outlet 28 of the compressor 24 and through the first spring directional valve 50 to the spring valve(s) 38 and air spring 22 to fill the air spring(s) 22. In an example of use of subject air management module system 20, one or more of the air springs 22 may be inflated from 10 bar to 15 bar, while the reservoir 34 is depleted from 15 bar to 10 bar.

During a deflating process of one or more of the air springs 22, the first reservoir valve 46 and the second spring directional valve 52 are opened along with the spring valve(s) 38 of the air spring(s) 22 that should be deflated. Furthermore, the second reservoir valve 48 and the first spring directional valve 50 are closed. As such, air passes from the air spring(s) 22, through the second spring directional valve 52, and to the compression chamber 56 of the compressor 24 to exert pressure on the piston 54 to reduce the torque load on the motor of the compressor 24. Air also flows through the outlet 28 of the compressor 24 and through the first reservoir valve 46 to the reservoir 34 to fill the reservoir 34.

In view of the foregoing, the manifold block assembly 36, or PCU, includes the valves 38, 46, 48, 50, 52, pressure sensor 31, external seal balls and any additional components. As shown, up to eight valves 38, 46, 48, 50, 52 may be utilized on the manifold block body 37, and the valves 38, 46, 48, 50, 52 remain in fixed positions to allow commonization of the manifold block assembly 36. All inlet and outlet ports 21, 23, 25, 27, 41, 43, 47 of the manifold block assembly 36 are in standardized positions, and up to eight ports 36 may be included. It should be appreciated that the common locations of these critical components minimizes manufacturing costs and investment.

As best illustrated in FIGS. 3-6, the manifold block assembly 36 further integrates the ECU 19 therein such that it provides an electro-pneumatic control unit (EPCU) 100. The manifold block assembly 36 further includes a single point harness connector 39, which combined with the integrated ECU 19, reduces the need for wire harnesses and mounting brackets. According to this arrangement, the EPCU 100 advantageously has compact size and mass. Additionally, it should be appreciated that it is advantageous to have all valves 38, 46, 48, 50, 52, pressure sensors 31 and pump elements combined in a single, compact manifold block assembly 36 along with the subsequently mated integrated ECU 19 because this "all-in-one" approach allows a single point of installation to be utilized for both hydraulic and electrical connections.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An air management system for a vehicle having a body and a plurality of wheels, said air management system including:
   at least one air spring for interconnecting the body and one of the wheels;
   a compressor for filling said at least one air spring;
   a reservoir fluidly connected to said at least one air spring and said at least one compressor for receiving air from said compressor and said at least one air spring and passing air to said at least one compressor and said at least one air spring;
   said compressor including a motor;
   said compressor defining a compartment having an inlet and an outlet;
   a piston moveable in said compartment and separating said compartment into a compression chamber and an extension chamber, said piston moveable in response to actuation of said motor in a compression stroke toward said compression chamber and an extension stroke toward said extension chamber, and wherein reciprocal movement of said piston causes a build-up of air pressure at said outlet;
   said inlet and said outlet of said piston being selectively connectable to said reservoir and said at least one air spring in an inflation mode and a deflation mode, wherein said inlet is connected to said reservoir and said outlet is connected to said at least one air spring in said inflation mode, and wherein said inlet is connected to said air spring and said outlet is connected to said reservoir in said deflation mode; and
   said piston defining at least one passage extending between said extension chamber and said compression chamber, and said piston including at least one check valve positioned in said at least one passage and allowing air to flow from said inlet to said outlet while preventing air from flowing from said outlet to said inlet during said reciprocal movement of said piston such that air pressure in said compression chamber biases said piston toward said extension chamber to reduce a torque load on said motor during movement of said piston.

2. An air management system as set forth in claim 1, wherein said at least one passage includes a horizontal passage extending in a horizontal direction and fluidly connected to said compression chamber, and wherein said at least one passage further includes a vertical passage extending in a vertical direction being perpendicular to said horizontal direction from said horizontal passage to said extension chamber.

3. An air management system as set forth in claim 2 wherein said at least one check valve includes a first check valve located in said vertical passage.

4. An air management system as set forth in claim 2 wherein said at least one check valve includes an outlet check valve located in said outlet.

5. An air management system as set forth in claim 1 further including a seal positioned about said piston and sealing said piston relative to a wall of said compartment.

6. An air management system as set forth in claim 1 wherein said compressor includes a piston housing defining said compartment containing said piston, and wherein said piston extends through said piston housing to said motor.

7. An air management system as set forth in claim 1 further including a manifold block assembly fluidly connecting said air springs, said compressor and said reservoir.

8. An air management system as set forth in claim 7 wherein a first line extends from said outlet of said compressor to a compressor inlet port of said manifold block assembly, and wherein a second line extends from said inlet of said compressor to a suction port of said manifold block assembly.

9. An air management system as set forth in claim 8 further including at least one spring valve connected to said at least one air spring, and an H-bridge assembly for directing air between said reservoir, said compressor and said manifold block assembly, wherein said H-bridge assembly includes a first reservoir valve fluidly connected to said first line and the reservoir, a second reservoir valve fluidly connected to said second line and said reservoir, a first spring direction valve fluidly connected to said first line and at least one spring valve connected to said at least one air spring.

10. An air management system as set forth in claim 9 wherein said manifold block assembly further includes an electronic control unit.

11. An air management system as set forth in claim 10 further including an electronic control unit configured such that during a filling process of said at least one air spring, said second reservoir valve, said first spring direction valve and said at least one spring valve are opened and said first reservoir valve and said second spring directional valve are closed to cause air to pass from said reservoir, through said second reservoir valve and to said compression chamber to exert a force on said piston to reduce a torque load on said motor of said compressor, and to flow through said passage of said piston through said outlet of said compressor and through said first spring directional valve and to said at least one spring valve and said at least one air spring.

12. An air management system as set forth in claim 11 wherein said electronic control unit is further configured such that in a deflating process of said at least one air spring, said first reservoir valve, said second spring directional valve and said at least one spring valve are open and said second reservoir valve and said first spring directional valve are closed to cause air to pass from said at least one air spring through said second spring directional valve and to said compression chamber to exert pressure on said piston to reduce a torque load on said motor of said compressor, and air flows through said passage of said piston and through said outlet of said compressor and to said reservoir.

13. An air management system for an air suspension system of a vehicle, including:
   a compressor for filling air springs of the air suspension system;
   said compressor including a motor and defining a compartment having an inlet and an outlet;
   a piston moveable in said compartment and separating said compartment into a compression chamber and an extension chamber, said piston moveable in response to actuation of said motor in a compression stroke toward said compression chamber and an extension stroke toward said extension chamber, and wherein reciprocal movement of said piston causes a build-up of air pressure at said outlet; and said piston defining at least one passage extending between said extension chamber and said compression chamber, and said piston including at least one check valve positioned in said at least one passage and allowing air to flow from said inlet to said outlet while preventing air from flowing from said outlet to said inlet during said reciprocal movement of said piston such that air pressure in said compression chamber biases said piston toward said extension chamber to reduce a torque load on said motor during movement of said piston.

14. The air management system as set forth in claim 13, further including at least one air spring for interconnecting a body and a wheel of the vehicle, and a reservoir fluidly connected to said at least one air spring and said compressor for receiving air from said compressor and said at least one air spring and passing air to the other of said at least one compressor and said at least one air spring.

15. The air management system as set forth in claim 14, wherein said inlet and said outlet of said piston are selectively connectable to said reservoir and said at least one air spring in an inflation mode and a deflation mode, wherein said inlet is connected to said reservoir and said outlet is connected to said at least one air spring in said inflation mode, and wherein said inlet is connected to said air spring and said outlet is connected to said reservoir in said deflation mode.

16. An air management system as set forth in claim 13, wherein said at least one passage includes a horizontal passage extending in a horizontal direction and fluidly connected to said compression chamber, and wherein said at least one passage further includes a vertical passage extending in a vertical direction being perpendicular to said horizontal direction from said horizontal passage to said extension chamber.

17. An air management system as set forth in claim 16 wherein said at least one check valve includes a first check valve located in said vertical passage.

18. An air management system as set forth in claim 16 wherein said at least one check valve includes an outlet check valve located in said outlet.

19. An air management system as set forth in claim 13 further including a seal positioned about said piston and sealing said piston relative to a wall of said compartment.

20. An air management system as set forth in claim 13 wherein said compressor includes a piston housing defining said compartment containing said piston, and wherein said piston extends through said piston housing to said motor.

* * * * *